United States Patent
Tang et al.

(10) Patent No.: US 11,745,491 B2
(45) Date of Patent: Sep. 5, 2023

(54) METHOD FOR PREPARING WEATHER-RESISTANT PRINTING BOARD

(71) Applicant: ANHUI SENTAI WPC-TEC FLOORING CO., LTD., Xuancheng (CN)

(72) Inventors: Daoyuan Tang, Xuancheng (CN); Dong Chen, Xuancheng (CN); Donghui Huang, Xuancheng (CN)

(73) Assignee: Anhui Sentai WPC-TEC Flooring Co., Ltd., Anhu (CN)

( * ) Notice: Subject to any disclaimer, the term of this patent is extended or adjusted under 35 U.S.C. 154(b) by 223 days.

(21) Appl. No.: 17/288,563

(22) PCT Filed: Oct. 28, 2020

(86) PCT No.: PCT/CN2020/124332
§ 371 (c)(1),
(2) Date: Apr. 25, 2021

(87) PCT Pub. No.: WO2022/073263
PCT Pub. Date: Apr. 14, 2022

(65) Prior Publication Data
US 2022/0274391 A1    Sep. 1, 2022

(30) Foreign Application Priority Data
Oct. 10, 2020    (CN) .......................... 202011075639.8

(51) Int. Cl.
*B32B 37/12* (2006.01)
*B32B 27/06* (2006.01)
*B32B 27/30* (2006.01)
*B32B 27/36* (2006.01)
*B32B 38/00* (2006.01)

(52) U.S. Cl.
CPC .............. *B32B 37/12* (2013.01); *B32B 27/06* (2013.01); *B32B 27/304* (2013.01); *B32B 27/308* (2013.01); *B32B 27/365* (2013.01); *B32B 38/145* (2013.01); *B32B 2307/712* (2013.01)

(58) Field of Classification Search
CPC .......... B32B 2255/10; B32B 2255/102; B32B 2255/26; B32B 2266/0235; B32B 2307/554; B32B 2307/712; B32B 2419/04; B32B 2471/00; B32B 27/06; B32B 27/065; B32B 27/08; B32B 27/304; B32B 27/308; B32B 27/365; B32B 37/12; B32B 37/1292; B32B 38/06; B32B 38/145; B32B 5/18; B32B 7/12
See application file for complete search history.

(56) References Cited

U.S. PATENT DOCUMENTS

2022/0274391 A1* 9/2022 Tang ...................... B32B 37/12

OTHER PUBLICATIONS

English translation of CN 107813575.*
English translation of OA for CN202011075639.8.*
English translation of PCT/CN2020/124332.*
English translation of KR20080110251.*
English translation of KR20120044837.*
English translation of written opinion of PCT/CN2020/124332.*
Espace search results dated Apr. 23, 2021.
Search Report for Chinese Application 2020110756398.

* cited by examiner

*Primary Examiner* — Sonya M Sengupta
(74) *Attorney, Agent, or Firm* — Olive Law Group, PLLC

(57) ABSTRACT

The present disclosure belongs to the technical field of board manufacturing, and relates to a method for preparing a weather-resistant printing board. It specifically includes the following steps: S-1, printing on at least one decorative surface of a core material layer of the board or on an overlay surface of a prefabricated wear-resistant layer to form a printed pattern layer; S-2, forming an adhesive layer between the printed pattern layer and the prefabricated wear-resistant layer or between the printed pattern layer and the core material layer; S-3, bonding the prefabricated wear-resistant layer and the core material layer to obtain the board. The peeling force of the wear-resistant layer of the outer layer of the board obtained by the present disclosure can reach at least 3 MPa, and at the same time, the prefabricated wear-resistant layer is adopted to reduce the requirements on device and production sites.

5 Claims, No Drawings

METHOD FOR PREPARING WEATHER-RESISTANT PRINTING BOARD

CROSS REFERENCE TO RELATED APPLICATIONS

This is a national phase application of PCT Application No. PCT/CN2020/124332, filed Oct. 28, 2020, which claims priority to Chinese Patent Application No. 2020110756398, filed Oct. 10, 2020, the contents of which are incorporated herein by reference in their entireties.

TECHNICAL FIELD

The present disclosure belongs to the technical field of board manufacturing, and relates to a method for preparing a board, in particular to a method for preparing a weather-resistant printing board.

BACKGROUND

In order to achieve the aesthetics and wear resistance required by the floor or other decorative boards, the embossing rollers are generally used to press a pattern similar to wood grain on the floor surface, so that the color of the pattern is more similar to that of the wood board. It is usually to print the desired pattern on the board, and then provide a protective layer on the pattern to protect the pattern.

For example, the applicant's earlier invention application with patent publication No. CN109849397A has disclosed the following steps: printing a pattern on the thermal transfer paper by a printer; and then placing the thermal transfer paper on the surface of the PVC foam core layer, transferring the pattern on the thermal transfer paper to the surface of the PVC foam core layer by using a transfer machine; then applying the glue: applying the modified glue evenly to the surface of the PVC core layer after thermal transfer, and then curing by UV; coating film: coating the film solution on the cured glue layer, and after the coating is finished, firing in a vulcanizer to obtain a semi-finished product.

In the actual production process, it is found that the peeling force of the film is not ideal and difficult to control. The covered film is easy to fall off after a period of use, especially when making outdoor floors. In outdoor environments, the service life of the floor is greatly shortened.

The prior art also adopts post-coextrusion to form the protective layer. For example, the U.S. Pat. No. 9,707,591B1 discloses a method of applying the outer layer to the extruded member. Although the peeling force of the formed outer layer can meet the requirements, the outer layer is difficult to ensure the same thickness, leading to inconsistent thickness of the final board, resulting in unqualified products, and unable to use the prefabricated protective layer, such that high device and production sites are required.

SUMMARY

The present disclosure is intended to provide a method for preparing a weather-resistant printing board, the peeling force of the wear-resistant layer of the outer layer can reach at least 3 MPa, and the prefabricated wear-resistant layer is adopted to reduce the requirements on device and production sites.

In order to achieve the above objective, the present disclosure adopts the following technical solutions:

A method for preparing a weather-resistant printing board can improve the adhesion performance of the printed pattern layer and the prefabricated wear-resistant layer through technological optimization, and can ensure the peel strength of the prefabricated wear-resistant layer. The method comprises the following steps:

S-1, printing on at least one decorative surface of a core material layer of the board or on an overlay surface of a prefabricated wear-resistant layer to form a printed pattern layer;

S-2, coating an adhesive on the prefabricated wear-resistant layer or the core material layer to form an adhesive layer;

S-3, bonding the prefabricated wear-resistant layer and the core material layer to obtain the board.

In the above technical solution, the prefabricated wear-resistant layer is adopted. Compared with the post-coextrusion method to form a protective wear-resistant layer, the requirements for device and site for board production can be reduced; and at the same time, in order to overcome the defects that the peel strength of the prefabricated wear-resistant layer is difficult to meet the requirements, the adhesive layer is provided to increase the bonding strength of the prefabricated wear-resistant layer and ensure the peel strength of the prefabricated wear-resistant layer. The printed pattern layer obtained by printing, because the pattern is often discontinuous, intermittent, has a certain pattern gap; with the help of the gap, the adhesive layer is partially interrupted (when the adhesive layer forms a uniform thickness, the adhesive layer is thinner than the pattern at the gap, and the traction on the surrounding adhesive layer is small when peeling off), to avoid the overall peeling off of the adhesive layer, thereby further ensuring the peel strength of the prefabricated wear-resistant layer. In addition, in the gap between the printed pattern layer, the adhesive layer directly bonds the core material layer. Compared with the direct bonding of the printed pattern layer, the connection strength is higher, and the peeling of the printed pattern layer is avoided.

In the prior art, it is also possible to use an affinity agent between the printed pattern layer and the adhesive layer or between the adhesive layer and the prefabricated wear-resistant layer to form an affinity agent layer. It is generally believed that the use of an affinity agent will enhance the connection force of the adhesive, but the inventor found that the use of the affinity agent in the present disclosure is likely to produce bubbles between the affinity agent layer and the adhesive layer during production or later use. This may be due to the incomplete volatilization of the solvent in the affinity agent, which not only affects the product, but also affects the strength of the connection between the layers, and also leads to a decrease in the strength of the board. In the case of not using an affinity agent, it was unexpectedly found that the peel strength is greater than that of using an affinity agent.

The core material layer can be any core material layer, not limited to polyvinyl chloride foamed materials, but also suitable for non-foamed polyvinyl chloride materials, polyvinyl chloride WPC materials, polyolefin WPC materials, SPC materials, etc. It is suitable for both foamed and non-foamed materials formed by thermoplastic materials.

The printing can be 3D printing or flat printing to print out patterns such as wood grain and patterns.

In a preferred embodiment, a coating amount of an adhesive used in the adhesive layer is 80-125 grams per square meter. That is, the thickness of the adhesive layer is the thickness formed by uniformly coating 80-125 grams of adhesive per square meter. The thickness of the adhesive layer not only directly affects the bonding effect, but also determines the peel strength. Since the adhesive layer is directly connected to the wear-resistant layer, it will also indirectly affect the wear-resistant and weather-resistant effects of the wear-resistant layer.

In a further preferred embodiment, the coating thickness of the adhesive layer is 110-120 grams per square meter.

The printed pattern layer can be printed on the core material layer or on the overlay surface of the prefabricated wear-resistant layer. In step S-2, the adhesive is coated on the on the prefabricated wear-resistant layer printed with the printed pattern layer, to form the adhesive layer. The adhesive layer is first coated on the prefabricated wear-resistant layer with the printed pattern layer, and then pasted on the core material layer to form a strong bond with the printed layer and the prefabricated wear-resistant layer, and then form a adhesive force with the core material layer, such that it is beneficial to increase the peel strength of the prefabricated wear-resistant layer, and is also the key to ensuring the peel strength.

In a preferred embodiment, in step S-1, the printed pattern layer is printed on the core material layer; in step S-2, the adhesive is coated on the core material layer printed with the printed pattern layer, to form the adhesive layer.

In a preferred embodiment, before printing the pattern layer on the prefabricated wear-resistant layer, a protective layer is first coated on the prefabricated wear-resistant layer. This protective layer not only helps the formation of the printed pattern layer, but also protects the printed pattern layer and adhesive layer after the board is formed. According to the understanding of inertial thinking, the protective layer will affect the connection strength between the prefabricated wear-resistant layer and the adhesive layer, the printed layer and the core material layer. However, in the present disclosure, the peel strength of the protective layer is not reduced when adding the protective layer; and on the contrary, a certain improvement is present, especially after a period of use, the peel strength is better than that without a protective layer. This may be because the protective effect of the protective layer on the adhesive layer is greater than the negative effect of its connection strength.

In a preferred embodiment, after the pattern layer is printed on the core material layer, a protective layer is coated on the formed printed pattern layer.

The above-mentioned protective layer may be a protective layer formed by weather-resistant paint, such as UV transparent weather-resistant paint.

In a preferred embodiment, the prefabricated wear-resistant layer is selected from a group consisting of a prefabricated PMMA layer, a prefabricated PC layer and a prefabricated PVDF layer, or the like.

In a further preferred embodiment, the prefabricated wear-resistant layer is a prefabricated PMMA layer. The anti-yellowing effect is the best when the prefabricated PMMA layer is adopted.

In a preferred embodiment, the adhesive is hot-melt adhesive, such as ethylene and its copolymers (EVA, EEA, EAA, EVAL) hot-melt adhesive, polyurethane (PUR) hot-melt adhesive, polyamide (PA) hot-melt adhesive, polyester (PES) hot-melt adhesive, etc.

In a further preferred embodiment, the adhesive is a polyurethane hot-melt adhesive. Even if a prefabricated PMMA layer with good anti-yellowing effect is adopted, yellowing still occurs after long-term use. The inventor further selected the adhesive used and found that after adopting the polyurethane glue, the yellowing phenomenon disappeared when used in combination with PMMA.

In a preferred embodiment, the thickness of the printed pattern layer is 0.1-1.5 filaments. The thickness of the printed pattern layer determines the interaction effect between the pre-coated adhesive layer and the adhesive layer. If it is too thin, it will affect the aesthetics and visual effects of the formed board. If it is too thick, it will form a poor connection with the adhesive layer.

In a preferred embodiment, the core material layer is a foamed core material layer.

In a further preferred embodiment, the core material layer is a PVC foamed core material layer.

In a preferred embodiment, before performing step S-3, a section of heating channel is passed first, and the temperature in the heating channel is maintained at 30-42° C.

In a preferred embodiment, after step S-3, the board obtained in step S-3 is subjected to health preservation treatment.

The second object of the present disclosure is to provide a board obtained by the above-mentioned method for preparing thereof, including a core material layer, a printed pattern layer printed on at least one decorative surface of the core material layer, a prefabricated wear-resistant layer located on the printed pattern layer, and an adhesive layer between the printed pattern layer and the prefabricated wear-resistant layer.

Beneficial Effect

By implementing the above technical solutions, the present disclosure has the following beneficial effects:

1. Using a prefabricated wear-resistant layer, compared to the post-coextrusion method to form a protective wear-resistant layer, the requirements for device and site for board production can be reduced;

2. It overcomes the defect that the post-coextrusion method is difficult to control the thickness consistency of the protective wear-resistant layer, and through the post-coextrusion method, the frosting roller operation is required to increase the frosting effect. While the prefabricated wear-resistant layer of the present disclosure has a frosting effect, the process can be simplified.

3. The printed pattern layer cooperates with the adhesive layer to ensure that the peel strength of the prefabricated wear-resistant layer is at least 3 MPa;

4. Through the adjustment and improvement of the preparation process, the peel strength of the prefabricated wear-resistant layer is further ensured and improved;

5. By selecting the type of glue used for the prefabricated wear-resistant layer and the adhesive layer, the yellowing phenomenon of the board is overcome.

DESCRIPTION OF EMBODIMENTS

In order to further explain the technical solution of the present disclosure in detail, the present disclosure will be further clarified below in combination with specific embodiments.

EXAMPLE 1

A method for preparing a wear-resistant printing board may include the following steps:

S-1, forming a core layer of target size by extruding, shaping, cooling, and cutting through an extruder;

S-2, inputting the core material layer to an online printing device, and printing out a printed pattern layer showing wood grain, figure or pattern, with a thickness of 0.5 silk;

S-3, coating PUR glue on an overlay surface of the prefabricated PMMA wear-resistant layer to form an adhesive layer.

The amount of glue applied may be 120 grams per square meter;

S-4, attaching and pressing the prefabricated wear-resistant layer with the adhesive layer on the printed pattern layer to form the prefabricated wear-resistant layer on the decorative layer;

S-5, curing the obtained board for 7 days in an environment with a temperature of 40° C. and a humidity of 60%.

EXAMPLE 2

A method for preparing a wear-resistant printing board may include the following steps:

S-1, forming a core material layer of the target size by extruding, shaping, cooling, and cutting through an extruder; and engraving a texture with wood grain, figure or pattern when the core material layer passes through the embossing roller;

S-2, inputting the core material layer to an online 3D printing device, and depositing the corresponding color on the texture, with a thickness of 1.5 filaments;

S-3, coating PUR glue on an overlay surface of the prefabricated PMMA wear-resistant layer to form an adhesive layer, with a glue amount of 80 grams per square meter;

S-4, attaching and pressing the prefabricated wear-resistant layer with the adhesive layer on the printed pattern layer to form the prefabricated wear-resistant layer on the decorative layer;

S-5, curing the obtained board for 7 days in an environment with a temperature of 40° C. and a humidity of 60%.

EXAMPLE 3

A wear-resistant printing board includes a core material layer, a printed pattern layer printed on the decorative surface of the core material layer, a prefabricated wear-resistant layer on the print pattern layer, and an adhesive layer between the printed pattern layer and the prefabricated wear-resistant layer.

The core material layer can be any core material layer, not limited to polyvinyl chloride foamed materials, but also suitable for non-foamed polyvinyl chloride materials, polyvinyl chloride WPC materials, polyolefin WPC materials, SPC materials, etc. It is suitable for both foamed and non-foamed materials formed by thermoplastic materials. In the embodiment, a PVC foamed core material layer is selected.

The preparation method may include the following steps:

S-1, forming a PVC foamed core material layer of the target size by extruding, shaping, cooling, and cutting through an extruder; and engraving a texture with wood grain, figure or pattern when the core material layer passes through the embossing roller;

S-2, inputting the core material layer to an online 3D printing device, and depositing the corresponding color on the texture, with a thickness of 1.0 filaments;

S-3, coating PUR glue on an overlay surface of the prefabricated PMMA wear-resistant layer to form an adhesive layer, with a glue amount of 110 grams per square meter;

S-4, attaching and pressing the prefabricated wear-resistant layer with the adhesive layer on the printed pattern layer to form the prefabricated wear-resistant layer on the decorative layer, to obtain the board;

S-5, curing the obtained board for 7 days in an environment with a temperature of 40° C. and a humidity of 60%.

EXAMPLE 4

The difference from Example 3 is that in step S-2, the adhesive is coated on the printed pattern layer to form an adhesive layer.

EXAMPLE 5

The difference from Example 3 is that a prefabricated PC film is adopted by the prefabricated wear-resistant layer.

EXAMPLE 6

The difference from Example 3 is that a polyamide glue is adopted by the adhesive.

EXAMPLE 7

The difference from Example 3 is that the prefabricated wear-resistant layer uses a prefabricated PVDF film.

EXAMPLE 8

The difference from Example 3 is that in S-2, after the printed pattern layer is formed, a protective layer is coated on the printed pattern layer, and the protective layer is made of UV transparent weather-resistant paint.

EXAMPLE 9

A method for preparing a wear-resistant printing board may include the following steps:

S-1, forming a core material layer of the target size by extruding, shaping, cooling, and cutting through an extruder;

S-2, inputting the core material layer to an online printing device, and printing out a printed pattern layer showing wood grain, figure or pattern, with a thickness of 0.5 silk;

S-3, coating PUR glue on an overlay surface of the prefabricated PMMA wear-resistant layer to form an adhesive layer, with a glue amount of 120 grams per square meter;

S-4, attaching and pressing the prefabricated wear-resistant layer with the adhesive layer on the printed pattern layer to obtain the board;

S-5, curing the obtained board for 7 days in an environment with a temperature of 40° C. and a humidity of 60%

EXAMPLE 10

The difference from Example 9 is that, before step S-2, a protective layer is coated on the reverse side of the prefabricated PMMA wear-resistant layer (that is, the side of the printed pattern layer), and the protective layer is made of UV transparent weather-resistant paint.

For the boards of Examples 1-10, the peel strength of the prefabricated wear-resistant layer was measured, and the measurement results are as follows:

TABLE 1

| Sample | Peel strength/MPa |
|---|---|
| Example 1 | 5.2 |
| Example 2 | 4.0 |

TABLE 1-continued

| Sample | Peel strength/MPa |
| --- | --- |
| Example 3 | 4.9 |
| Example 4 | 3.3 |
| Example 5 | 4.0 |
| Example 6 | 3.0 |
| Example 7 | 4.5 |
| Example 8 | 4.5 |
| Example 9 | 5.0 |
| Example 10 | 4.8 |

In addition, the inventor also measured the peel strength of the boards according to Examples 9 and 10 after six months of exposure in the open air, and it was showed that the peel strength of the board according to Example 9 was 4.5 MPa, while the peel strength of the board according to Example 10 was still maintained at 4.8 MPa.

COMPARATIVE EXAMPLE 1

A method for preparing a wear-resistant printing board may include the following steps:

S-1, forming a core material layer of the target size by extruding, shaping, cooling, and cutting through an extruder; and engraving a texture with wood grain, figure or pattern when the core material layer passes through the embossing roller;

S-2, inputting the core material layer to an online 3D printing device, and depositing the corresponding color on the texture, with a thickness of 5 filaments;

S-3, coating PUR glue on an overlay surface of the prefabricated PMMA wear-resistant layer to form an adhesive layer, with a glue amount of 120 grams per square meter;

S-4, attaching and pressing the prefabricated wear-resistant layer with the adhesive layer on the printed pattern layer to form the prefabricated wear-resistant layer on the decorative layer;

S-5, curing the obtained board for 7 days in an environment with a temperature of 40° C. and a humidity of 60%.

The difference from Example 1 is that the printed pattern layer has a thickness of 5 filaments.

COMPARATIVE EXAMPLE 2

A method for preparing a wear-resistant printing board may include the following steps:

S-1, forming a core material layer of the target size by extruding, shaping, cooling, and cutting through an extruder; and engraving a texture with wood grain, figure or pattern when the core material layer passes through the embossing roller;

S-2, inputting the core material layer to an online 3D printing device, and depositing the corresponding color on the texture, with a thickness of 5 filaments;

S-3, coating PUR glue on an overlay surface of the prefabricated PMMA wear-resistant layer to form an adhesive layer, with a glue amount of 50 grams per square meter;

S-4, attaching and pressing the prefabricated wear-resistant layer with the adhesive layer on the printed pattern layer to form the prefabricated wear-resistant layer on the decorative layer;

S-5, curing the obtained board for 7 days in an environment with a temperature of 40° C. and a humidity of 60%.

The difference from Example 1 is that the amount of glue coated to the adhesive layer is 50 grams per square meter.

COMPARATIVE EXAMPLE 3

A method for preparing a wear-resistant printing board may include the following steps:

S-1, forming a core material layer of the target size by extruding, shaping, cooling, and cutting through an extruder; and engraving a texture with wood grain, figure or pattern when the core material layer passes through the embossing roller;

S-2, inputting the core material layer to an online 3D printing device, and depositing the corresponding color on the texture, with a thickness of 5 filaments;

S-3, coating PUR glue on an overlay surface of the prefabricated PMMA wear-resistant layer to form an adhesive layer, with a glue amount of 150 grams per square meter;

S-4, attaching and pressing the prefabricated wear-resistant layer with the adhesive layer on the printed pattern layer to form the prefabricated wear-resistant layer on the decorative layer;

S-5, curing the obtained board for 7 days in an environment with a temperature of 40° C. and a humidity of 60%.

The difference from Example 1 is that the amount of glue coated to the adhesive layer is 150 grams per square meter.

COMPARATIVE EXAMPLE 4

The difference from Example 1 is that no adhesive layer is provided, and the prefabricated wear-resistant layer is directly bonded to the printed pattern layer by heat pressing.

COMPARATIVE EXAMPLE 5

The preparation method of Embodiment 2 disclosed in Chinese invention patent application CN109849397A was adopted.

For the boards obtained in Comparative Examples 1-5, the peel strength of the prefabricated wear-resistant layer was measured. The test method is carried out by the wear resistance measurement method in GB/T17657-2013, the measurement results are as follows:

TABLE 2

| Samples | Peel strength/MPa |
| --- | --- |
| Comparative Example 1 | 2.9 |
| Comparative Example 2 | 2.4 |
| Comparative Example 3 | 2.3 |
| Comparative Example 4 | 1.6 |
| Comparative Example 5 | 2.2 |

From the peel strength data in Table 2, Comparative Example 1 is worse than Example 3 because the printed pattern layer is too thick, but the thickness of the adhesive layer remains unchanged, leading to the breakage of the overall adhesiveness of the adhesive layer, resulting in a deteriorating in the bond strength. Comparative Examples 2 and 3 are worse than Example 3 because the amount of glue applied to the adhesive layer is too much or too little, causing the overall adhesiveness of the adhesive layer to be too strong and easy to fall off as a whole, or too weak to cause insufficient adhesive force. Comparative Example 4 is worse than Example 3 in that no adhesive layer is provided and does not have the effect of the adhesive layer of the present disclosure.

In addition, the wear resistance tests of the boards obtained in Examples 1-7 and Comparative Examples 1-5 were also carried out:

Test method: Test Method 3 of Wear Resistance provided in GB/T17657-2013. The results are shown in Table 3.

TABLE 3

| Samples | Wear Value (g/100 r) |
| --- | --- |
| Example 1 | 0.05 |
| Example 2 | 0.05 |
| Example 3 | 0.05 |
| Example 4 | 0.06 |
| Example 5 | 0.07 |
| Example 6 | 0.06 |
| Example 7 | 0.07 |
| Example 8 | 0.04 |
| Example 9 | 0.05 |
| Example 10 | 0.04 |
| Comparative Example 1 | 0.05 |
| Comparative Example 2 | 0.06 |
| Comparative Example 3 | 0.06 |
| Comparative Example 4 | 0.06 |
| Comparative Example 5 | 0.08 |

In addition, the surface adhesion strength tests were carried out on the boards obtained in Examples 1-7 and Comparative Examples 1-5:

Test method: GB/T15102-2006, the surface adhesion strength determination method. The results are shown in Table 4.

TABLE 4

| Samples | Surface Adhesion Strength/MPa |
| --- | --- |
| Example 1 | 1.72 |
| Example 2 | 1.41 |
| Example 3 | 1.69 |
| Example 4 | 1.29 |
| Example 5 | 1.40 |
| Example 6 | 1.26 |
| Example 7 | 1.64 |
| Comparative Example 1 | 1.22 |
| Comparative Example 2 | 1.15 |
| Comparative Example 3 | 1.14 |
| Comparative Example 4 | 0.60 |
| Comparative Example 5 | 1.13 |

In addition, weather resistance tests were carried out on the boards obtained in Examples 1-10 and Comparative Examples 1-5:

100 pieces of the board samples of each example and comparative example were taken, and the yellowing conditions were counted after 1000 hours of UV. The results are shown in Table 5.

TABLE 5

| Samples | Percentage of Yellowing/% |
| --- | --- |
| Example 1 | 0 |
| Example 2 | 0 |
| Example 3 | 0 |
| Example 4 | 0 |
| Example 5 | 9 |
| Example 6 | 9 |
| Example 7 | 12 |
| Example 8 | 0 |
| Example 9 | 0 |
| Example 10 | 0 |
| Comparative Example 1 | 3 |
| Comparative Example 2 | 0 |
| Comparative Example 3 | 3 |
| Comparative Example 4 | 18 |
| Comparative Example 5 | 25 |

What is claimed is:

1. A method for preparing weather-resistant printing board, wherein comprising the following steps:

S-1, printing on an overlay surface of a prefabricated wear-resistant layer to form a printed pattern layer, wherein before printing the pattern layer on the prefabricated wear-resistant layer, coating a protective layer first on the prefabricated wear-resistant layer, and then printing a pattern on the protective layer formed by a weather-resistant paint;

S-2, coating an adhesive on the prefabricated wear-resistant layer printed with the printed pattern layer, to form an adhesive layer;

S-3, bonding the prefabricated wear-resistant layer formed with the adhesive layer and the core material layer to obtain the board.

2. The method according to claim 1, wherein a coating amount of an adhesive used in the adhesive layer in step S-2 is 80-125 grams per square meter.

3. The method according to claim 1, wherein the prefabricated wear-resistant layer is selected from a group consisting of a prefabricated PMMA layer, a prefabricated PC layer and a prefabricated PVDF layer.

4. The method according to claim 3, wherein the prefabricated wear-resistant layer is a prefabricated PMMA layer.

5. A board obtained by a method according to any one of claims 1, 2, 3, or 4.

* * * * *